United States Patent [19]

Minohara et al.

[11] 4,441,375

[45] Apr. 10, 1984

[54] GYROSCOPIC INSTRUMENT

[75] Inventors: Kiyomi Minohara, Takarazuka; Atsushi Abe, Suita, both of Japan

[73] Assignee: Furuno Electric Co., Ltd., Nishinomiya, Japan

[21] Appl. No.: 225,152

[22] Filed: Jan. 14, 1981

[30] Foreign Application Priority Data

| Jan. 23, 1980 | [JP] | Japan | 55-7110 |
| Feb. 8, 1980 | [JP] | Japan | 55-14932 |
| Jul. 7, 1980 | [JP] | Japan | 55-92998 |
| Jul. 24, 1980 | [JP] | Japan | 55-102193 |

[51] Int. Cl.³ .................. G01C 19/20; G01C 19/24
[52] U.S. Cl. .................. 74/5.46; 33/327; 74/5 R; 74/5.4
[58] Field of Search ........... 74/5 R, 5.4, 5.6 C, 74/5.46, 5.34; 33/327; 308/9

[56] References Cited

U.S. PATENT DOCUMENTS

| 1,589,039 | 6/1926 | Anschutz-Kaempfe | 33/327 |
| 2,585,024 | 2/1952 | Lundberg | 74/5.4 |
| 3,221,563 | 12/1965 | Wing | 74/5 R |
| 3,296,872 | 1/1967 | Ten Bosch et al. | 74/5.34 |
| 3,373,617 | 3/1968 | Lassig | 74/5.46 |
| 4,008,623 | 2/1977 | Ehrich et al. | 74/5.46 |
| 4,143,466 | 3/1979 | Quermann | 33/327 |

OTHER PUBLICATIONS

"Phenomena and Relationships of Magnetic Fluid Bearings", R. E. Rosenweig.

*Primary Examiner*—Rodney H. Bonck
*Attorney, Agent, or Firm*—Jordan and Hamburg

[57] ABSTRACT

The present invention is directed to a gyroscopic instrument comprising concentric containers, the inner container enclosing a rotating electric gyro rotor, magnetic fluid enclosed between the inner and outer concentric containers, and magnetic flux producing means mounted on at least one of the two concentric containers, so that magnetic fluxes reach the magnetic fluid to support the inner container without contacting the outer container. The magnetic flux producing means are preferably mounted and oriented on a line drawn on at least one of the concentric containers at predetermined distances so that magnetic fluxes transmitted from the pole of one flux means reach the opposite pole of an adjacent means by passing through the magnetic fluid.

26 Claims, 10 Drawing Figures

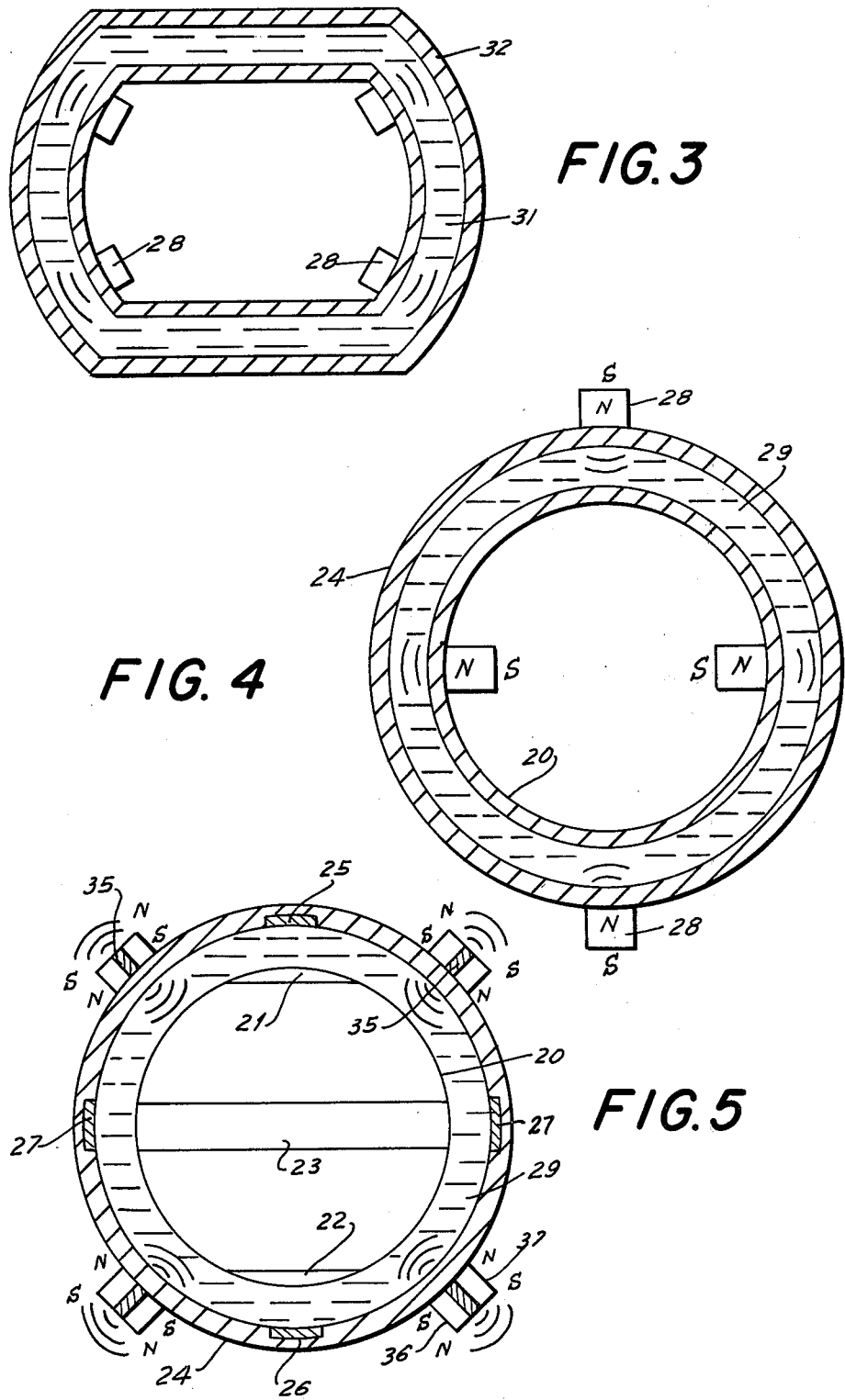

GYROSCOPIC INSTRUMENT

BACKGROUND OF THE INVENTION

The present invention relates to a gyroscopic instrument, more particularly to a gyroscopic compass of the type in which an inner container enclosing one or more high speed rotating gyro rotors is floating in a supporting liquid filled in an outer container, with the inner container being supplied with electric power from the outer container side. Specifically, the invention relates to a gyroscopic instrument in which an inner container is supported to float by a magnetic fluid free of contact with an outer container.

Gyroscopic instruments of this type are well known in the art and are disclosed, for instance, in U.S. Pat. Nos. 3,373,617 and 4,008,623. A prior art gyroscopic instrument is shown in FIG. 1. A hollow sphere 1 contains a pair of motordriven gyroscopes therein and is provided with conductive electrode postions 2 and 3 at its poles and with an electrode portion 4 extending along its equator. The sphere is kept in a freely floating condition within an electrically conductive liquid. Electrodes 5, 6 and 7 are provided on a vessel surrounding the sphere at a distance therefrom. The vessel consists of a lower, substantially semi-spherical part 8 and of a coaxial upper dish-shaped part 9. The parts 8 and 9 of the vessel are mounted on the inside of and rigidly connected with a spherical container 10. The container is filled with the electrically conductive liquid and is mounted in a housing (not shown). A pump 11 is mounted on the container 10. An inlet is formed by an aperture 12 of the vessel at the bottom thereof whereas an outlet is formed by the space provided between the upper edge of the vessel part 8 and the edge of the dish-shaped vessel part 9. A gap 13 is formed between the lower part of the sphere 1 and the semi-spherical part 8. The inner surface 14 of the container 10 and the outer surface of the vessel part 8 confine between them the passageway leading from the outlet to the inlet 12. The flow of liquid entering the gap 13 through the inlet aperture 12 will flow in all directions as indicated by the arrows 15, thereby forming a liquid bearing which will keep the sphere 1 in a freely floating condition centered in the spherical vessel 8, 9.

As is easily understood, the prior art gyroscopic instrument has such drawbacks as follows: (1) a pump is required to be mounted on an outer container in order to produce the flow of a liquid for holding an inner container, (2) the inner surface of an outer container must be shaped to induce sufficient restoring forces to act upon an inner container from various directions, (3) a control system is further required for maintaining the temperature of the supporting liquid constant, and (4) an inner container may be damaged due to, for instance, the pitching and rolling of the ship, when the gyroscopic instrument is switched off, since the inner container descends and stays on the bottom inner surface of an outer container.

Accordingly, an object of the present invention is to provide a gyroscopic instrument which does not require a pump for producing the flow of a supporting liquid, with the inner surface of the outer container thereof being simply shaped.

Another object of the invention is to provide a gyroscopic instrument which does not require a control system for maintaining the temperature of a supporting liquid constant.

Another object of the invention is to provide a gyroscopic instrument which is capable of floating the inner container even when the instrument is switched off.

Another object of the invention is to provide a gyroscopic instrument in which the inner container is supported to float by the magnetic fluid subjected to magnetic fields.

Another object of the invention is to provide a gyroscopic instrument in which the magnetic fields are locally generated by the magnets mounted on the inner and/or outer containers at a plurality of places.

Another object of the invention is to provide a gyroscopic instrument in which the magnetic fluid regions influenced by the magnetic fields generated can be narrowed so that the mechanical and electrical operations taking place in the inner container are not affected by the magnetic fields.

SUMMARY OF THE INVENTION

In order to achieve these and other objects of the invention, a gyroscopic instrument is provided which comprises (1) a magnetic fluid, (2) an outer container in which the magnetic fluid is filled, (3) an inner container enclosing at least one high speed rotating gyro rotor, being supplied with electric power from the outer container side and being positioned within said container, and (4) magnetic flux producing means mounted on at least one of the outer and inner containers so that magnetic fluxes produced thereby reach the magnetic fluid to support said inner container free of contact with the outer container.

Other objects and features of the present invention will be described in more detail herein with reference to the accompanying drawings.

BRIEF DESCRIPTION OF THE DRAWINGS

FIG. 3 is a simplified vertical section taken through a gyroscopic instrument according to a second embodiment of the invention, with the components in the inner container not shown;

FIG. 4 is a simplified vertical section taken through a gyroscopic instrument according to a third embodiment of the invention in which magnets are mounted on both the inner and outer spheres;

FIG. 5 is a vertical section taken through a gyroscopic instrument according to a fourth embodiment of the invention in which eight pairs of magnets are mounted on the outer sphere at the angular points of the regular hexahedron inscribed therein;

Throughout the drawings, the same reference numerals are given to like components.

DESCRIPTION OF THE PREFERRED EMBODIMENTS

Figure 1:
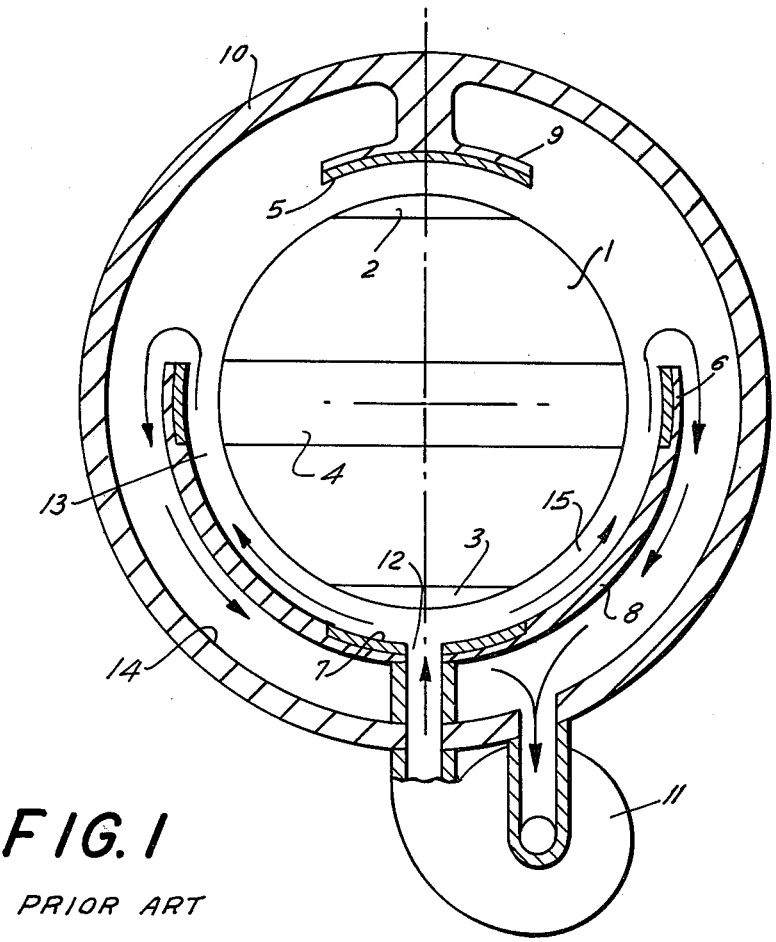
FIG. 1 is a vertical section taken through a prior art gyroscopic instrument in which a pump is mounted on the outer container and the container is provided with a single inlet aperture at its bottom for the liquid circulated through the gap.
Figure 2:
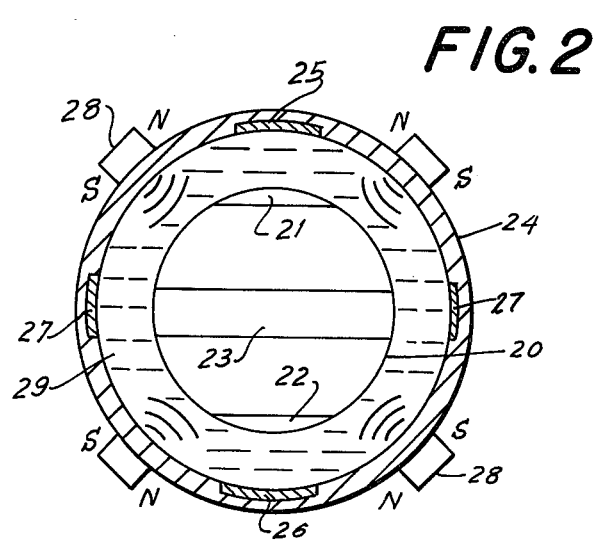
FIG. 2 is a vertical section taken through a gyroscopic instrument according to a first embodiment of the present invention in which eight magnets are mounted on the outer sphere at the angular points of the regular hexahedron inscribed therein.

Referring to FIG. 2, a hollow sphere 20 is made of non-magnetic material, for instance plastic material, contains for example, a pair of motor-driven gyroscopes therein, and is provided with conductive electrode portions 21 and 22 at its poles and with an electrode portion 23 extending along its equator. The sphere 20 is supported to float by the magnetic fluid filled in an outer spherical container 24. The outer container 24 is also made of non-magnetic material, is provided with electrodes 25, 26 and 27, facing electrode portions 21, 22 and 23 respectively, and is mounted on a ship by a gimbal mechanism (not shown). Eight permanent magnets 28 are respectively fixed on the outer container 24 at the angular points of an imaginary regular polyhedron, for example, a hexahedron inscribed within the outer sphere 24. Each permanent magnet 28 is adjustably mounted thereon in the radial direction. Magnets of the same flux density are preferably used. The magnetic fluid 29 is a colloidal liquid in which ferromagnetic particles in colloidal size are distributed throughout the liquid. As a magnetic fluid, "Ferricolloid W-35" manufactured by Tohoku Metal Industries, Ltd. may be used. The electric currents supplied from the electrodes 25, and 26 pass through the magnetic fluid 29, to the respective portions 21, and 22. Electric power may be transmitted to the inner container by the conductive wires connected between the terminals affixed in the inner and outer containers.

The magnetic fluid 29 is partially subjected to the magnetic fields respectively produced by the permanent magnets 28.

Since the magnetic fluid, as any ferromagnetic material, is attracted towards regions of higher field, the fluid is attracted away from the center of the outer sphere 24. Since the magnetic fluid is incompressible and fills the outer container, pressure is increased in directions away from the center of the sphere 24. When the inner sphere 20 is located at the center point, pressure forces are symmetrically distributed over its surface, and hence the sphere 20 is maintained to stay at the center point of the outer sphere 24. If the inner sphere 20 is displaced from the midpoint, the pressure forces are unbalanced and restoring forces direct the sphere 20 towards the midpoint. Thus the sphere 20 is maintained at the center point of the outer sphere 24.

It should be noted that the density $\phi$ of the magnetic fluid is given by the equation (1):

$$\phi = 3 Mg/4\pi R^3 \tag{1}$$

where
M: the mass of the inner sphere
g: acceleration of gravity
R: the radius of the inner sphere.

If the density of the magnetic fluid is different from the above value, the inner sphere tends to ascend or descend depending on the value of the density of the magnetic fluid. Such measures becomes necessary for mounting other magnets on the outer sphere 24 or increasing the intensity of the magnetic fields produced by some of the magnets, in order to maintain the inner sphere 20 at the midpoint of the outer sphere 24.

It should be noted that electro-magnets can be used in the place of permanent magnets. In this case, the intensity of the magnetic field produced may be more easily controlled.

It should be noted that three magnets can also be respectively mounted on the lower part of the outer sphere at the angular points of the regular triangle horizontally inscribed within the outer sphere. In this case, the density of the magnetic fluid must be made smaller than the one mentioned above.

It should be noted that three magnets may also be respectively affixed on the upper part of the outer sphere at the angular points of the regular triangle horizontally inscribed within the outer sphere. In this case, the density of the magnetic fluid must be made larger than the one aforementioned.

It should be noted that the magnetic circuits formed in the inner container are preferably magnetically shielded.

It should be noted that containers 31, 32 shaped in a drum form as shown in FIG. 3 may also be used.

It should be noted that magnets can be mounted on the inner container instead of the outer container, or may be mounted on both the inner and outer containers as shown in FIG. 4.

With the gyro instruments shown in FIGS. 2, 3, and 4, magnetic fluxes produced by the magnets enter into the inner container. Since rotor shafts and rotor bearings, etc., contained in the inner sphere are made of magnetic material, the magnetic fluxes entering therein affect the operation taking place therein and hence give rise to errors in the north-seeking operation performed by the inner container. This problem can be solved by magnetically shielding the magnetic components contained in the inner container, which is, however, difficult and troublesome. The gyroscopic instrument shown in FIG. 5 easily solves the problem by narrowing the regions over which magnetic fields cover to a minimum.

Referring to FIG. 5, a magnetic flux producing means 35 comprises a pair of permanent magnets which are placed in such a way that the north and south poles of one magnet respectively face the south and north poles of the other magnet. Pairs of permanent magnets 35 are mounted on the outer sphere 24 at the angular points of a regular polyhedron, for example a hexahedron imaginarily inscribed within the outer sphere 24. Thus, magnetic flux lines leaving the north pole of a magnet take the shortest route possible to the south pole of the other magnet, narrowing the area over which the magnetic fields extend. The intensity of the magnetic fields and the magnetically influenced regions can be controlled by selecting proper permanent magnets in size and quality, or by properly determining the distance between two adjacent pairs of magnets, or by adjusting pairs of magnets in the radial directions. Accordingly, the inner sphere 20 can be supported by the magnetic fluid subjected to magnetic fields to float free of contact with the outer sphere 24, without affecting the operation taking place in the inner sphere.

It should be noted that electro-magnets can be used in place of the permanent magnets.

It should be noted that three pairs of magnets can also be respectively mounted on the lower part of the outer sphere at the angular points of the regular triangle imaginarily horizontally inscribed within the outer sphere. In this case, the density of the magnetic fluid must be made smaller than the one given by the equation (1).

It should be noted that three pairs of magnets 35 may also be respectively fixed on the upper part of the outer container at the angular points of the regular triangle horizontally inscribed within the outer container 24. In this case, the density of the magnetic fluid must be made larger than the one given by the equation (1).

It should be noted that pairs of magnets may be mounted on the containers shaped in a drum form as shown in FIG. 3.

It should be noted that pairs of magnets can be mounted on the inner container 20 instead of the outer container, or may be mounted on both the inner and outer containers as shown in FIG. 4. When pairs of magnets are mounted on the inner container, it is possible to short-circuit the magnetic flux pathes formed on inward sides of the pairs of the magnets by placing magnetic plates made of, for instance, permalloy on the inward sides of the pairs of the magnets. As a result, the magnets do not influence the operation taking place in the inner container.

With the gyroscopic instrument shown for instance in FIG. 5, heat is radiated by the inner sphere enclosing a pair of motor-driven gyroscopes and is produced when the electric currents flow through the magnetic fluid. The heat generated raises the temperature of the magnetic fluid, thereby decreasing the specific gravity thereof and hence moving the inner sphere in a downward direction to the bottom inner surface of the outer container. The displacement of the inner sphere gives rise to errors in the north-seeking operation taking place therein and may cause the inner sphere to be damaged when the ship pitches or rolls.

The present invention solves this problem by mounting many pairs of magnets to locally produce magnetic fluxes at many places extending into the magnetic fluid, thereby totally supplying sufficient bearing forces to the inner sphere so that the inner sphere can always be supported to float free of contact with the outer sphere, irrespective of the temperature change of the magnetic fluid. Since pairs of magnets are used to narrow the regions where magnetic fields extend, the operation taking place in the inner container is not affected.

Figure 6:
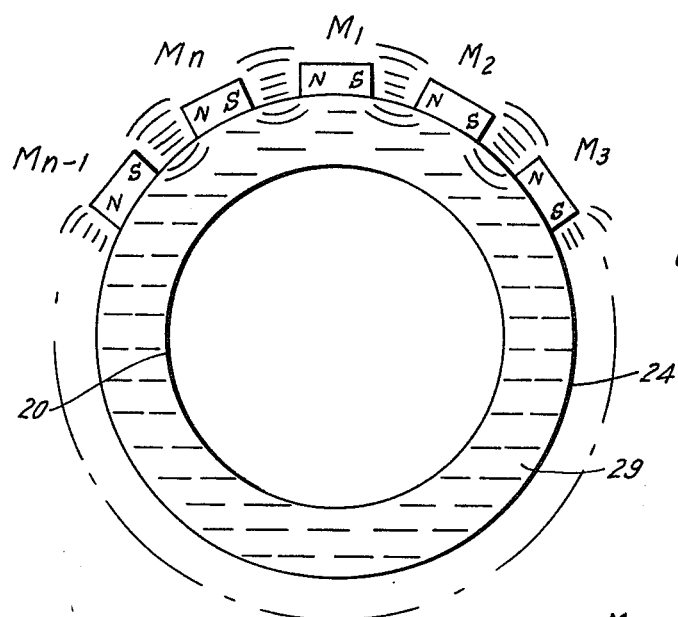
FIG. 6 is a simplified horizontal section taken through a gyroscopic instrument according to a fifth embodiment of the invention in which magnets are mounted on a line horizontally circumscribed on the the lower part of the outer sphere.

Referring to FIG. 6, permanent magnets $M_1$, $M_2$, $M_3$ ... $Mn$ are fixedly mounted on a line horizontally circumscribed on the lower part of the outer sphere 24 at a distance between two adjacent magnets in such a way that the north pole of one magnet faces the south pole of the next magnet. A ring of magnets is formed. The density of the magnetic fluid is made smaller than the one given by the equation (1). Thus magnetic fluxes leaving the north pole of a magnet go through the magnetic fluid and reach the south pole of the next magnet, thereby locally producing magnetic fields extending into the magnetic fluid and hence totally supplying sufficient bearing forces to the inner sphere to hold it irrespective of the temperature change of the magnetic fluid. As easily anticipated, the areas over which the magnetic fields extend can be adjusted by varying the distance between two adjacent magnets.

Figure 7:
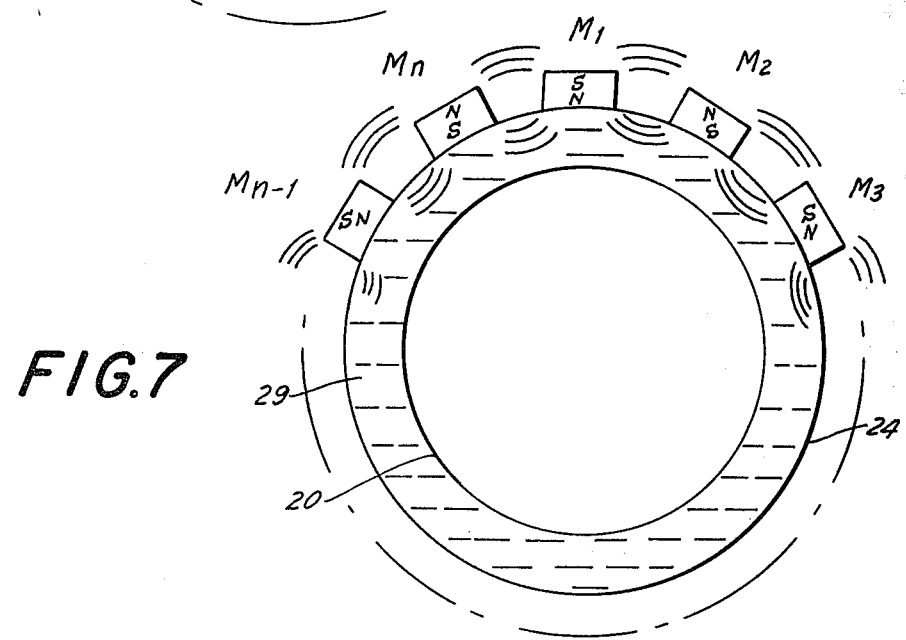
FIG. 7 is a simplified horizontal section taken through a gyroscopic instrument according to a sixth embodiment of the invention in which magnets are mounted lengthwise on a line horizontally circumscribed on the lower part of the outer sphere.

Referring to FIG. 7, each permanent magnet $M_1$, $M_2$, $M_3$ ... $Mn$ is vertically mounted on a line horizontally circumscribed on the lower part of the outer sphere 24 at a distance between two adjacent magnets. The polar orientation of the magnets is substantially along a diameter of the outer sphere 24. It is arranged that the north pole of a magnet touches the surface of the outer sphere 24 and the south pole of the next magnet is on the surface thereof. The orientation of poles of the magnets alternate. Since this embodiment can increase the density of the magnetic fluxes entering into the magnetic fluid 29 compared with the one shown in FIG. 6, this arrangement is preferably worked in large-sized gyroscopic instruments.

Figure 9:
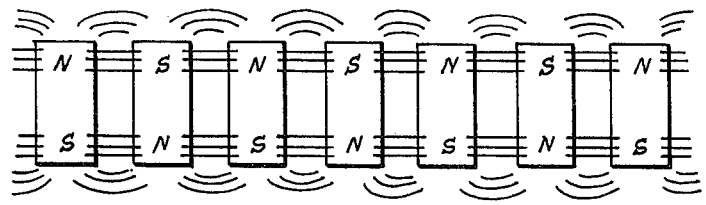
FIG. 9 is an explanatory diagram of FIG. 8 showing in detail the arrangement of magnets.
Figure 8:
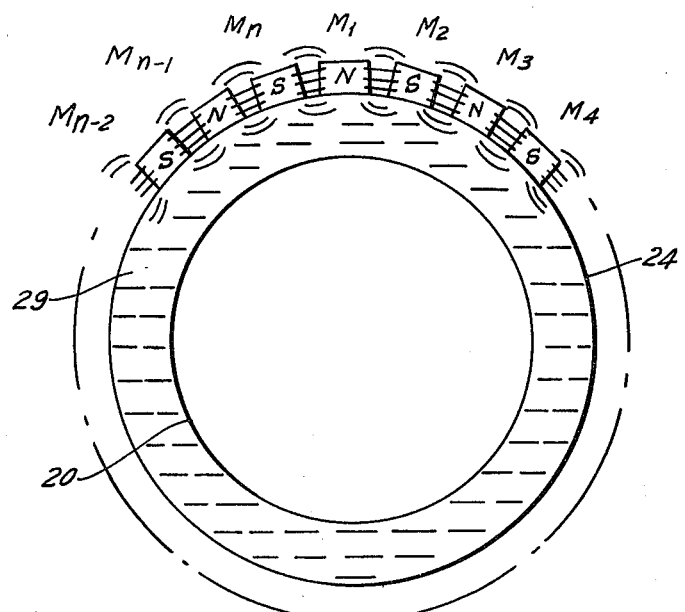
FIG. 8 is a simplified horizontal section taken through a gyroscopic instrument according to a seventh embodiment of the invention in which magnets are mounted on a line horizontally circumscribed on the lower part of the outer sphere at right angles to the line at a distance between adjacent magnets.

Referring to FIGS. 8 and 9, permanent magnets $M_1$, $M_2$, $M_3$ ... $Mn$ are fixedly mounted on a line horizontally circumscribed on the lower part of the outer sphere 24 at right angles to the line at a distance between two adjacent magnets in such a way that the orientation of poles of the magnets alternates. The polar orientation of the magnets is substantially perpendicular to a diameter of the outer sphere 24. Since this embodiment allows fewer magnetic fluxes leaving the north pole of a magnet to reach the south pole of the adjacent magnet through the magnetic fluid 29 compared with the one shown in FIG. 7, and magnetic fluxes are produced at both ends of the magnets, this arrangement is preferably worked in small-sized gyroscopic instruments.

Figure 10:
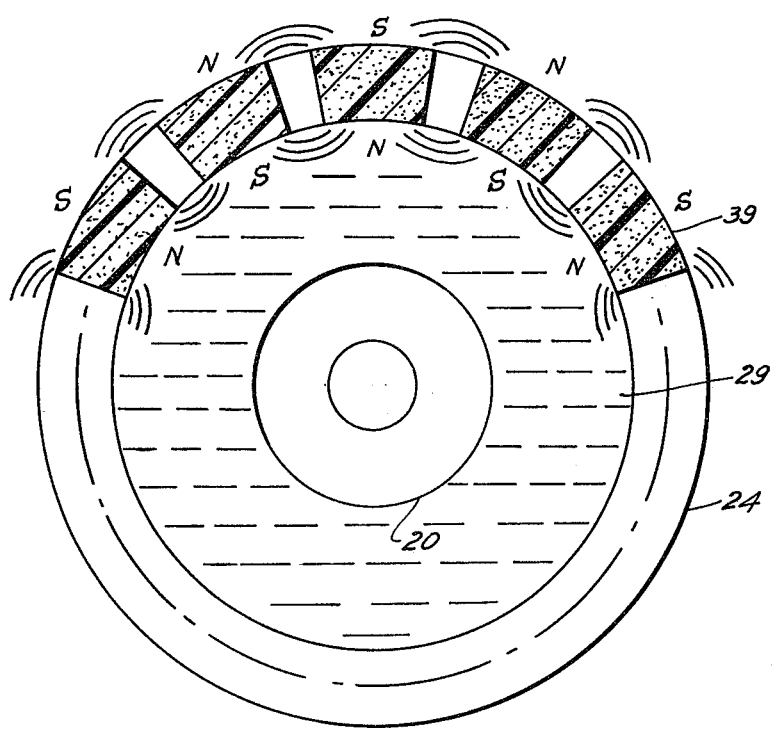
FIG. 10 is a simplified horizontal section taken through a gyroscopic instrument according to an eighth embodiment of the invention in which magnets are formed in the outer sphere by having magnetic material parts therein magnetized.

Referring to FIG. 10, magnetic material parts 39 are formed on a line horizontally circumscribed on the lower part of the outer sphere 24 at a distance between two adjacent parts. The outer sphere 24 may be made of plastic material. The magnetic material may be obtained by tying together the particles of cobalt and samarium with plastic, which is manufactured by a British company and is called "Hermax". Then the magnetic material parts are magnetized to make magnets as shown in FIG. 9 so that magnetic fluxes leaving the north pole of a produced magnet go to the south poles of adjacent magnets through the magnetic fluid 29.

Referring to FIGS. 6 through 10, it should be noted that electro-magnets can be used in place of the permanent magnets.

Referring to FIGS. 6 through 10, it should noted that magnets are mounted or formed on a plurality of lines horizontally circumscribed on the lower part of the outer sphere 24 at predetermined distances between two adjacent magnets so that magnetic fluxes leaving the north pole of a magnet reach the south poles of adjacent magnets through the magnetic fluid.

Referring to FIGS. 6 through 10, it should be noted that magnets may be mounted on a line horizontally circumscribed on the upper part of the outer sphere 24 at a distance between two adjacent magnets so that magnetic fluxes leaving the north pole of a magnet go to the south poles of adjacent magnets through the magnetic fluid. It should also be noted that magnets may be mounted or formed on a plurality of lines horizontally circumscribed on the upper part of the outer sphere at distances between two adjacent magnets. In this case, the density of the magnetic fluid is made larger than the one given by the equation (1).

It should be noted that magnets may be mounted or formed on both a line horizontally circumscribed on the lower part of the outer sphere and on a line horizontally circumscribed on the upper part thereof. It should also be noted that magnets may be mounted on a plurality of horizontal lines circumscribed throughout the whole surface of the outer sphere.

It should be noted that containers shaped in a drum form as shown in FIG. 3 can also be used.

It should be noted that magnets can be mounted on the inner container instead of the outer container, or may be mounted on both the inner and outer containers.

It should be noted that magnets are mounted on at least two longitudinal lines drawn on the surface of the lower or upper parts of the outer container.

It should be noted that magnets are mounted on one or more longitudinal lines drawn throughout the whole surface of the container.

While the invention has been described in detail and with reference to specific embodiments thereof, it will be apparent to one skilled in the art that various changes and modifications can be made therein without departing from the spirit and scope of the invention.

What is claimed is:

1. A gyroscopic instrument, comprising:
   a. a magnetic fluid,
   b. an outer container encompassing said magnetic fluid,
   c. an inner container enclosing at least one high speed rotating gyro rotor, being supplied with electric power from the outer container side and being positioned within said container, and
   d. magnetic flux producing means adjustably mounted on the outer container so that magnetic fluxes produced thereby reach said magnetic fluid to support said inner container free of contact with said outer container, said magnetic flux producing means comprising a pair of magnets which are oriented adjacent to one another with the north pole of one magnet facing the south pole of an adjacent magnet.

2. A gyroscopic instrument as defined in claim 1 wherein the containers are shaped as drums.

3. A gyroscopic instrument as defined in claim 1 wherein the specific gravity of the inner container is greater than the specific gravity of the magnetic fluid, and the magnetic flux producing means are mounted in the lower portion of the outer container.

4. A gyroscopic instrument as defined in claim 1 wherein the specific gravity of the inner container is less than the specific gravity of the magnetic fluid, and the magnetic flux producing means are mounted in the upper portions of the outer container.

5. A gyroscopic instrument as defined in claim 1 wherein the magnetic flux producing means are respectively mounted on the outer container at the angular points of a regular polygon inscribed within the outer container.

6. A gyroscopic instrument as defined in claims 1, 2, 3, 4 or 5 wherein the magnetic flux producing means is a permanent magnet.

7. A gyroscopic instrument as defined in claims 1, 2, 3, 4 or 5 wherein the magnetic flux producing means is an electro-magnet.

8. A gyroscopic instrument as defined in claims 1, 2, 3, 4 or 5 wherein parts of the outer container are magnetized.

9. A gyroscopic instrument as defined in claim 1 wherein the magnetic fluid is conductive.

10. A gyroscopic instrument, comprising:
    a. a magnetic fluid,
    b. an outer container emcompassing said magnetic fluid,
    c. an inner container enclosing at least one high speed rotating gyro rotor being supplied with electric power from the outer container side and being positioned within said container, and
    d. magnetic flux producing means adjustably mounted on the outer container on a line drawn on said outer container at a predetermined distance between the adjacent magnetic flux producing means so that magnetic fluxes transmitted from the north pole of a magnetic flux producing means reach the south pole of at least one adjacent magnetic flux producing means through said magnetic fluid, thereby supporting said inner container to float free of contact with said outer container.

11. A gyroscopic instrument as defined in claim 10 wherein the containers are shaped as drums.

12. A gyroscopic instrument as defined in claim 10 wherein the specific gravity of the inner container is greater than the specific gravity of the magnetic fluid, and the magnetic flux producing means are mounted on at least one horizontal line circumscribed on the lower portion of the outer container.

13. A gyroscopic instrument as defined in claim 10 wherein the specific gravity of the inner container is less than the specific gravity of the magnetic fluid, and the magnetic flux producing means are mounted on at least one horizontal line circumscribed on the upper portion of the outer container.

14. A gyroscopic instrument as defined in claim 10 wherein the magnetic flux producing means are mounted on at least one horizontal line circumscribed on the lower portion of the outer container and are mounted on at least one horizontal line circumscribed on the upper portion of the outer container.

15. A gyroscopic instrument as defined in claim 10 wherein the specific gravity of the inner container is greater than the specific gravity of the magnetic fluid, and the magnetic flux producing means are mounted on at least two substantially longitudinal lines drawn on the lower portions of the outer container.

16. A gyroscopic instrument as defined in claim 10 wherein the specific gravity of the inner container is less than the specific gravity of the magnetic fluid, and the magnetic flux producing means are mounted on at least two substantially longitudinal lines on the upper portions of the outer container.

17. A gyroscopic instrument as defined in claim 10 wherein the magnetic flux producing means are mounted on a plurality of substantially horizontal or substantially longitudinal lines drawn on the outer container.

18. A gyroscopic instrument as defined in claims 10, 12, 13, 14, 15, 16 or 17 wherein the magnetic flux producing means is a permanent magnet.

19. A gyroscopic instrument as defined in claims 10, 12, 13, 14, 15, 16 or 17 wherein the magnetic flux producing means is an electro-magnet.

20. A gyroscopic instrument as defined in claim 10 wherein the magnetic fluid is conductive.

21. A gyroscopic instrument as defined in claim 10 wherein the magnetic flux producing means are respectively mounted on the outer container at the angular points of a regular polygon inscribed within the outer container.

22. A gyroscopic instrument as defined in claim 21 wherein the magnetic flux producing means is a permanent magnet.

23. A gyroscopic instrument as defined in claim 21 wherein the magnetic flux producing means is an electro-magnet.

24. A gyroscopic instrument as defined in claim 10 wherein portions of the outer container are magnetized.

25. A gyroscopic instrument as defined in claim 10 wherein polar orientation of said magnetic flux producing means is substantially along a diameter of said outer container.

26. A gyroscopic instrument as defined in claim 10 wherein polar orientation of said magnetic flux producing means is substantially perpendicular to a diameter of said outer container.

* * * * *